United States Patent [19]

Nashif et al.

[11] Patent Number: 5,754,123
[45] Date of Patent: May 19, 1998

[54] HYBRID ULTRASONIC AND RADAR BASED BACKUP AID

[75] Inventors: Peter Joseph Nashif, Canton; Robert Harlow Benedict, Ann Arbor; Stan John Tracy, Bloomfield, all of Mich.

[73] Assignee: Ford Motor Company, Dearborn, Mich.

[21] Appl. No.: 643,714

[22] Filed: May 6, 1996

[51] Int. Cl.$^6$ .................................................. G08G 1/16
[52] U.S. Cl. .......................... 340/903; 340/435; 340/436; 367/909
[58] Field of Search ................................. 340/903, 904, 340/435, 436, 437; 367/909

[56] References Cited

U.S. PATENT DOCUMENTS

| | | | |
|---|---|---|---|
| Re. 34,773 | 11/1994 | Dombrowski | 340/904 |
| 3,707,717 | 12/1972 | Frielinghaus | 342/23 |
| 3,790,780 | 2/1974 | Helmcke et al. | 340/903 |
| 4,551,722 | 11/1985 | Tsuda et al. | 340/904 |
| 4,561,064 | 12/1985 | Bruggen et al. | 364/561 |
| 4,846,297 | 7/1989 | Field et al. | 180/169 |
| 4,996,468 | 2/1991 | Field et al. | 180/169 |
| 5,026,153 | 6/1991 | Suzuki et al. | 356/1 |
| 5,028,920 | 7/1991 | Dombrowski | 340/904 |
| 5,206,652 | 4/1993 | Hoyt et al. | 342/52 |
| 5,247,296 | 9/1993 | Spies | 340/903 |
| 5,529,138 | 6/1996 | Shaw et al. | 180/169 |
| 5,530,771 | 6/1996 | Maekawa | 340/435 |
| 5,574,426 | 11/1996 | Shisgal et al. | 340/435 |

OTHER PUBLICATIONS

Amerigon 1994 Product Catalog, 1994, 1–13.

*Primary Examiner*—Jeffery A. Hofsass
*Assistant Examiner*—Davetta Woods
*Attorney, Agent, or Firm*—Paul K. Godwin

[57] ABSTRACT

A backup aid system, for a vehicle, senses when the vehicle is in reverse gear. Ultrasonic sensors at the rear of the vehicle provide continuous range information to a control module for objects that are detected as being relatively close to the vehicle. A radar system provides range information to the control module for objects detected beyond the range of the ultrasonic system. At low speeds below a predetermined minimum speed level or when the system is placed in the "park" mode for parking, the radar information is ignored and only the ultrasonic information is used to warn the vehicle operator. At a relatively high threshold backup speed, the vehicle operator is immediately warned to slow down, whether or not an object is detected in the vehicle path. Between the lower and upper threshold speeds, both the ultrasonic system and the radar system are used to continuously range and detect any objects that enter their respective detection fields. The control module causes an alarm device to warn the driver as to how close the vehicle is to the closest object.

10 Claims, 3 Drawing Sheets

HYBRID ULTRASONIC AND RADAR BASED BACKUP AID

BACKGROUND OF THE INVENTION

The present invention is primarily directed to the field of remote sensing and more specifically to the area of vehicle operator alerting systems.

It is well-known that ultrasonic, light and radar energy can be transmitted in predictable patterns so as to be reflected off objects and sensed as return energy within predetermined ranges. In the case of ultrasonic wave energy transmissions, the normal range is quite short when compared to the capabilities of light or radar transmissions. On the other hand, light transmissions can often be obscured by dust, snow, rain or other environmental factors. Radar systems are available with a wide range of features and capabilities. However, the range of features and capabilities are a function of cost and are often unsuitable for automotive applications.

When used in a vehicle warning system, an ultrasonic system is able to detect close-up objects within a range of approximately two meters or less. Due to the short range constraint, ultrasonic backup warning systems typically cannot provide a warning to the vehicle operator with sufficient reaction time if the vehicle is traveling backwards at a speed greater than 5–10 miles per hour. However, the use of ultrasonic backup warning systems is preferred because they are low cost and provide continuous range information for detected objects.

Radar systems have the ability to look at distances well beyond the range of ultrasonic systems.

Inexpensive radar sensors are available with transmit and receive elements operating on impulse radar or doppler radar principles. Such inexpensive radar systems usually lack the sophisticated circuitry that is necessary to resolve and give accurate range information for objects detected close in. They are most suitable as long range devices, that if used in parking situations, would not be able to give accurate and useful range resolution for close-in objects. For these reasons, a low cost radar system alone does not provide all capabilities necessary for a reliable backup aid warning system.

SUMMARY OF THE INVENTION

It is an object of the present invention to provide a backup aid warning system for a vehicle that employs both an ultrasonic system and a radar system. This warning system is controlled in such a way as to utilize the complimentary strengths of each of the ultrasonic and radar systems and to overcome the deficiencies of each system alone.

The backup aid system is intended for use in an automotive vehicle having a controllable propulsion source capable of being operated to propel the vehicle in either a forward or reverse direction. The system operates in either a backup aid mode, or a parking aid mode that is either automatic or manually controlled by the vehicle operator. The system includes an ultrasonic system having at least one ultrasonic sensor element located at the rear of the vehicle. The ultrasonic sensor element may be either a single transceiver element or made up of separate transmitter and receiver elements. In any event, the sensor element is positioned to transmit ultrasonic wave energy away from the rear of the vehicle and to receive ultrasonic wave energy reflected from objects located within a first predetermined receiving range of distance from the vehicle. Each sensor element generates an ultrasonic range output signal with range information corresponding to the closest object detected within its first predetermined range.

The system also includes a radar system having at least one radar sensor element located at the rear of the vehicle. Like the ultrasonic sensor element, the radar sensor element may be either a single transceiver element or made up of separate transmitter and receiver elements. The radar sensor element is positioned to transmit electromagnetic wave energy away from the rear of the vehicle and to receive electromagnetic wave energy reflected from objects located within a second predetermined receiving range of distance from the vehicle. The second range is greater than and extends beyond the first range of the ultrasonic sensor element. The radar sensor element generates a radar range output signal with range information corresponding to the closest object detected within the second predetermined range.

A central control module is connected to detect when the propulsion source is operated to propel the vehicle in the reverse direction. The control module then responsively activates the ultrasonic and radar system when such operation is detected and provides an alarm output when an object is detected as being located within the first or second receiving ranges.

An alarm means is also included which receives the output from the control module and responsively notifies the vehicle operator of an alarm event.

In short, when the vehicle is in reverse gear, the ultrasonic sensors provide continuous range information to the control module for objects that are detected as being relatively close to the vehicle. The radar system provides range information to the control module for objects detected beyond the range of the ultrasonic system. In some cases, such as at low speeds below a predetermined minimum speed level or when the system is placed in the "park" mode and when the vehicle is being maneuvered in reverse gear for parking, the radar information is ignored and only the ultrasonic information is used to warn the vehicle operator.

The control module also senses the speed of the vehicle so that when the vehicle is traveling backwards at a relatively high rate, the vehicle operator is immediately warned to slow down, whether or not an object is sensed in the vehicle path. Below that upper threshold speed, both the ultrasonic system and the radar systems are used to continuously range and detect any objects that enter their respective detection fields. The control module causes the alarm device to warn the driver as to how close the vehicle is to the closest object.

In the described embodiment, both the radar and the ultrasonic detectors are energized when the vehicle is placed in its reverse gear. Depending upon speed of the vehicle as it proceeds to backup, detected object range information is fed to the control module and sorting takes place to determine the closest sensed object and provide a corresponding warning based upon the range of that closest object to the vehicle.

DETAILED DESCRIPTION OF THE PREFERRED EMBODIMENT

Figure 1:
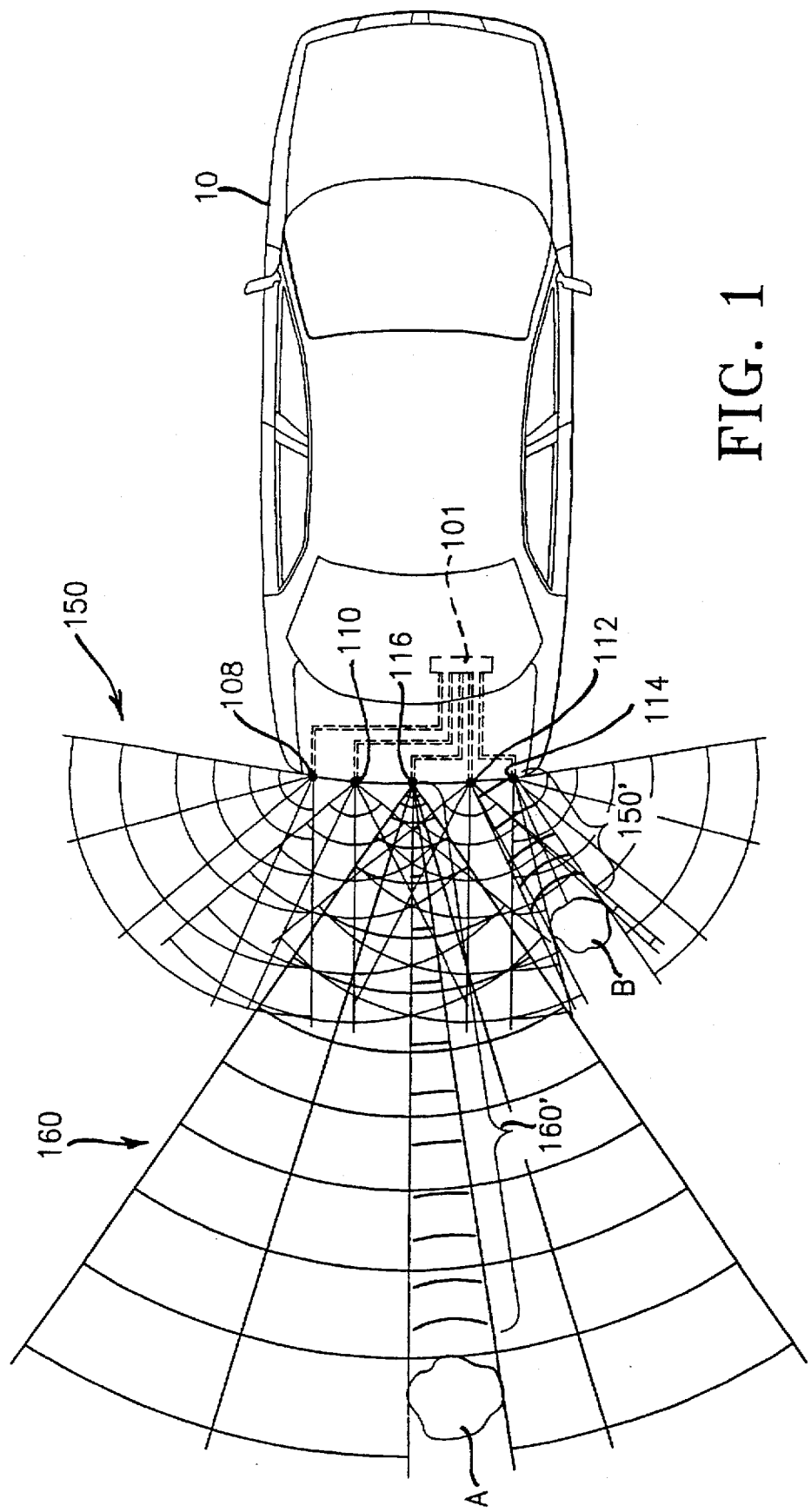
FIG. 1 is an overhead view of a vehicle employing an embodiment of the invention.

In FIG. 1, a vehicle 10 having its front end positioned to the right hand side of the drawing and its rear end positioned at approximately the center of the drawing, contains a programmed or logic control module 101 which is electrically connected to ultrasonic sensor elements 108, 110, 112, and 114 positioned at the rear end of the vehicle, preferably in the bumper. The ultrasonic sensors have a range of approximately 0 to 2 meters with a wide angular range which is greater than 90°. By placing four such sensors along the rear bumper of the vehicle 10, the range area of coverage 150 is overlapping among the adjacent sensors to insure that any object located near or behind the vehicle within the 2 meter range will be detected.

In addition, a radar detector 116 is positioned on the rear of the vehicle 10. The radar sensor element 116 typically has a more narrow angular sector and has a relatively long distance range that is well beyond the 2 meter limitation of the ultrasonic sensors. The radar sensor used in the present invention is useful for detecting objects that are within approximately 5 meters of the vehicle. Depending upon the sophistication and expense of the sensor, radar sensors can be selected to provide much longer detection ranges and greater target resolution. The particular sensor used in this embodiment is called an ultra-wideband impulse radar which emits very low power, high frequency impulses. However, it should be understood that other radar systems could be substituted for the radar selected for this embodiment.

In FIG. 1, an object A is shown as being in the radar sensor range 160 and reflects energy along its path 160' back to the sensor 116. Similarly, an object B is shown in FIG. 1 wherein the ultrasonic sensors 112 and 114 detect its presence within their overlapping ranges and their energy is reflected back to the sensors along the path 150'.

Although not shown in this FIG. 1, the control module 101 is also connected to a controllable propulsion source for the vehicle. The control module 101 senses when the propulsion source is being operated to propel the vehicle in the reverse direction. The control module 101 also senses the speed of the vehicle.

Figure 2:
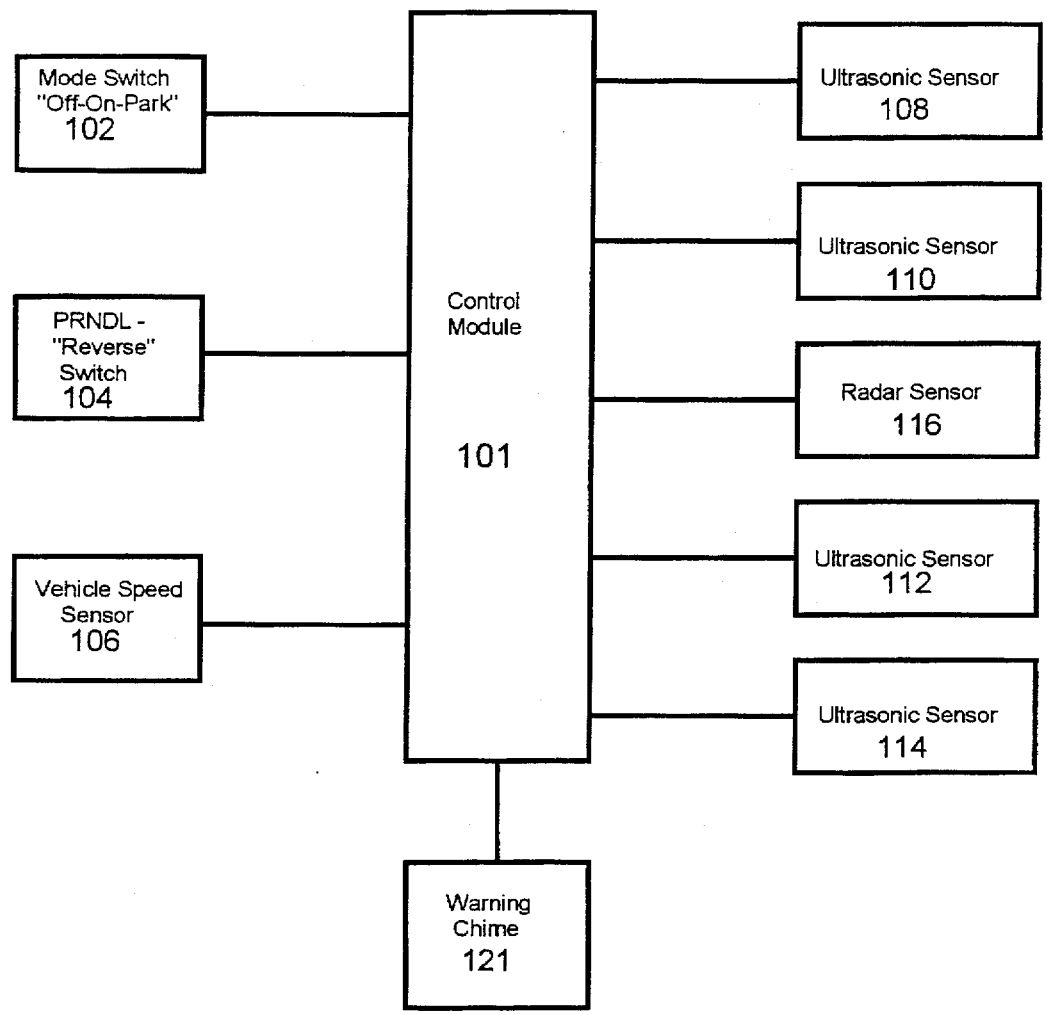
FIG. 2 is a block diagram of the control module connected to the various sensors, switches and an alarm device.

In FIG. 2, a more detailed block diagram is provided which shows the various sensors providing inputs to the control module 101. The ultrasonic sensors 108, 110, 112, and 114, as well as the radar sensor 116, are shown as being connected to the control module 101. Although shown as single lines, it should be understood that the connections provide both power and detected target data that is communicated between the control module 101 and the respective sensors.

A mode switch 102 is illustrated as a block, but is implemented as a conventional three-way switch having "Off" and "On" and "Park" modes that are manually controlled by the vehicle operator.

A reverse switch 104 is provided in a conventional PRNDL control on the transmission of the vehicle to provide a signal to the control module 101 indicating that the transmission of the vehicle is switched to its reverse gear.

A vehicle speed sensor 106 which is conventional on most vehicles, to provide speed information to the engine control or traction control systems, also provides vehicle speed data to the control module 101.

A warning chime sounding device 121 is used as a warning indicator for the vehicle operator. In addition or alternatively, a flashing light or other display device may be used, as long as the warning device can communicate to the vehicle operator when an object is detected and the approximate range of the object.

System operation is described with reference to FIG. 3. The system is initially energized when the vehicle engine is operating and the transmission is switched to its reverse gear. Alternatively, the system could be powered up when the ignition is on and the transmission is in "park". This would allow the system to detect objects behind the vehicle and give a warning prior to the operator shifting to the reverse gear.

Figure 3:
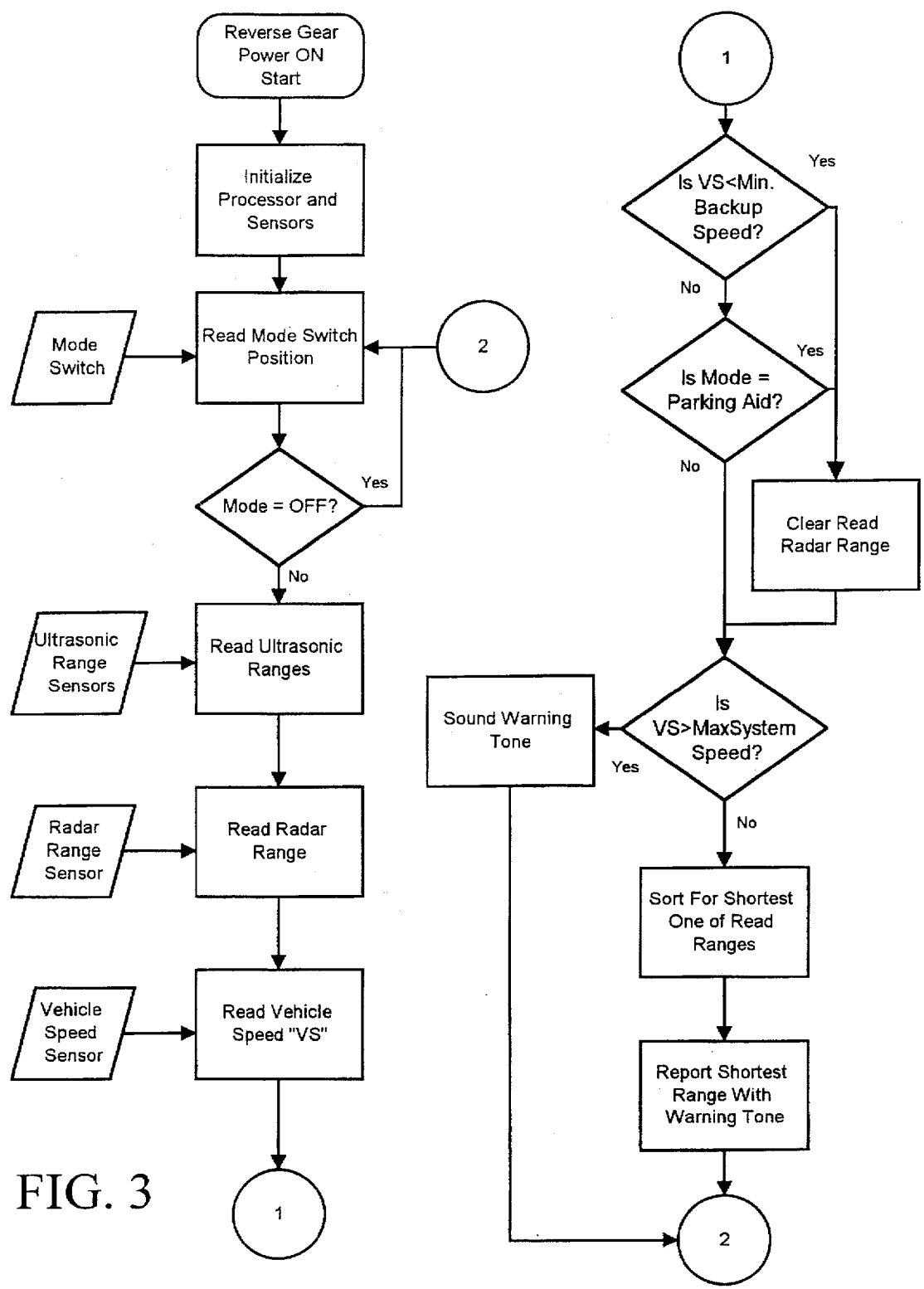
FIG. 3 is a flow diagram used to illustrate the method of operation of the invention.

In FIG. 3, the processor (controller) and sensors are initialized and powered up and the mode switch position is read. If the mode switch is in the "Off" position, the program continues to read the switch with no further action until the mode switch is changed. If the mode switch is not in the "Off" position, the energized ultrasonic range sensors are read. Each ultrasonic range sensor transmits wave energy and receives reflected wave energy from objects within its range. Each sensor provides an analog output with a duty cycle that corresponds to the closest reflected object indicative of the range of the object detected by the sensor. In the case of object B in FIG. 1, the surface of the object B is closer to ultrasonic sensor 114 than it is to ultrasonic sensor 112. Therefore, the output of sensor 114 will have a lower range value than the output of sensor 112. In any event, all of the target range information from the four sensors is read.

The radar range sensor is also read. Similar to the ultrasonic range sensors, the radar range sensor provides an analog output with a duty cycle indicative of the range of the closest target it detects. The speed of the vehicle is also read from the vehicle speed sensor as "VS" and is stored.

A decision is made regarding the vehicle speed VS as to whether or not it is below a "minimum backup speed" value. In this embodiment, the minimum backup speed value is selected as approximately 5 mph. If the backup speed is below that speed, or the mode switch is set in the parking aid ("Park") position, the system will rely only on the ultrasonic close-in range information and ignore the radar detection information.

If the speed of the vehicle is above the minimum backup speed and the parking mode switch is in the "On" position (not Off or not in Park position), the system checks to see whether or not the vehicle speed is greater than the "maximum system speed". In this embodiment the maximum system speed is selected as approximately 10 mph. The maximum system speed being that speed above which the vehicle operator is given a constant warning of excessive reverse speed and that because of the speed a potential danger exists in the operation of the vehicle in the rearward direction.

If vehicle speed is less than the maximum system speed, the system sorts for the shortest target range from the remaining data from the sensors. With that information, the system then causes a warning tone to be sounded. In this case a warning is pulsed at a rate that is indicative of the shortest range target being detected. (Alternative visual displays or sound warnings could be used.) The system then returns to read the mode switch position and updates the warning as necessary, until the mode switch is turned off or the transmission is taken out of reverse gear.

As can be seen from the foregoing discussion and drawings, if the mode system is in the parking aid mode, the effect of the radar ranging system is ignored and only the information from the ultrasonic range sensors is used to provide a signal to the operator when an object is within that relatively short detection range. On the other hand, if the mode switch is in the "On" position, and vehicle is switched into reverse gear, both the radar range sensor and the ultrasonic range sensors provide information to the system and the system reports a warning feedback to the vehicle operator based on the closest object detected by any of the sensors.

What is claimed:

1. A backup aid system for use in an automotive vehicle, having a controllable propulsion source, capable of being operated to propel the vehicle in either a forward or reverse direction comprising:

an ultrasonic system having at least one ultrasonic sensor element located at the rear of the vehicle, directed to transmit ultrasonic wave energy away from the rear of the vehicle and to receive ultrasonic wave energy reflected from objects positioned within a first predetermined receiving range of distance from the vehicle, and generating an ultrasonic range output signal with range information corresponding to the closest object detected within the first predetermined range;

a radar system having at least one radar sensor element located at the rear of the vehicle, directed to transmit electromagnetic wave energy away from the rear of the vehicle and to receive electromagnetic wave energy reflected from objects positioned within a second predetermined receiving range of distance from the vehicle, wherein said second range is greater than and extends beyond said first range of distance, and generating a radar range output signal with range information corresponding to the closest object detected within the second predetermined range;

a control module connected to detect when said propulsion source is operated to propel said vehicle in the reverse direction, to responsively activate said ultrasonic and radar systems when such operation is detected and providing an alarm output when an object is detected as being located within the first or second receiving ranges; and alarm means for receiving the output from the control module and for responsively notifying the operator of an alarm event.

2. A backup aid system as in claim 1, which further includes means for detecting the speed of said vehicle when it is propelled in the reverse direction, and said control module being connected to said speed detecting means, whereby, when said control module determines that said detected vehicle speed is below a first predetermined speed, said control module provides an alarm output only when an object is detected by said ultrasonic system as being located in said first range.

3. A backup aid system as in claim 1, wherein said controllable propulsion source includes an engine and an engageable transmission and said control module is connected to detect when said transmission is engaged with said engine to propel said vehicle in the reverse direction and said control module provides said responsive activation in response to said engagement detection.

4. A backup aid system as in claim 1, which further includes means for detecting the speed of said vehicle when it is propelled in the reverse direction, and said control module being connected to said speed detecting means, whereby said control module determines that said detected vehicle speed is above a relatively high predetermined speed and responsively provides an alarm output.

5. A backup aid system as in claim 1, wherein said control module provides said alarm output as a signal that has a value indicative of the range of the closest object detected and said alarm means provides a notification to the operator that corresponds to the range of the closest detected object.

6. A backup aid system as in claim 1, wherein said ultrasonic system includes a plurality of ultrasonic transmitting and detecting elements positioned at the rear of the vehicle and said ultrasonic system generates a range ultrasonic output signal with range information corresponding to the closest object detected within the first predetermined range for each transmitting and detecting element.

7. A method of detecting the presence of objects behind a vehicle when said vehicle is being operated in a reverse direction, including the following steps:

detecting when said vehicle is being operated in a reverse direction;

generating and directing ultrasonic signals away from the rear of said vehicle while said vehicle is being detected as operating in a reverse direction;

detecting ultrasonic signals reflected from objects located within a first predetermined distance range extending rearward from said vehicle;

generating and directing electromagnetic radar signals away from the rear of said vehicle while said vehicle is being detected as operating in a reverse direction;

detecting radar signals reflected from objects located within a second predetermined distance range extending rearward from said vehicle wherein said second predetermined range is larger than said first predetermined range; and providing an alarm indication when an object is detected as being located behind said vehicle.

8. A method as in claim 7, further including the steps of:

determining which of the signals reflected from objects behind said vehicle corresponds to the closest object and providing an alarm that is indicative of the distance of the closest detected object.

9. A method as in claim 8, further including the steps of:

detecting the speed of said vehicle as it is operated in said reverse direction;

determining whether said vehicle is being operated above or below a predetermined speed;

and when said vehicle is determined to be operating below said predetermined speed, providing an alarm indication only when an object is detected as being located in said first predetermined range.

10. A method as in claim 7, further including the steps of:

detecting the speed of said vehicle as it is operated above or below a predetermined speed;

determining whether said vehicle is being operated above or below a predetermined speed;

an when said vehicle is determined to be operating below said predetermined speed, providing an alarm indication only when an object is detected as being located in said first predetermined range.

* * * * *